United States Patent
Bamberger et al.

(10) Patent No.: US 6,612,964 B2
(45) Date of Patent: Sep. 2, 2003

(54) METHOD OF CONTROLLING THE TRANSMISSION RATIO OF A CONTINUOUSLY VARIABLE TOROIDAL TRANSMISSION

(75) Inventors: Joachim Bamberger, Gröbenzell (DE); Joachim Horn, München (DE); Peter Michau, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/779,293

(22) Filed: Feb. 8, 2001

(65) Prior Publication Data

US 2001/0016537 A1 Aug. 23, 2001

(30) Foreign Application Priority Data

Feb. 8, 2000 (DE) .......................................... 100 05 463

(51) Int. Cl.⁷ .......................... B60K 41/12; B06F 17/00
(52) U.S. Cl. ........................................... 477/37; 701/57
(58) Field of Search ........................... 477/34, 37, 68, 477/41, 44–49, 156–162; 701/51, 54, 61; 476/9–10, 40–42, 47–49

(56) References Cited

U.S. PATENT DOCUMENTS 5,707,313 A * 1/1998 Suzuki .......................... 477/43
6,045,481 A * 4/2000 Kumagai ...................... 477/37

OTHER PUBLICATIONS

"Toroidgetriebe mit verbesserten Kennwerten" (Tenberge), dated 1998, VDI Berichte No. 1939, pp. 703–724, pertains to Toroidal Transmissions with Improved Characteristics, as mentioned on p. 3 of the specification.

* cited by examiner

Primary Examiner—Thu Nguyen
(74) Attorney, Agent, or Firm—Laurence A. Greenberg; Werner H. Stemer; Ralph E. Locher

(57) ABSTRACT

In a method of controlling a transmission ratio of a continuously variable toroidal transmission, a holding force for an intermediate roller is pilot-controlled as a function of the torques acting on the toroidal disks and of the pivoted position of the intermediate roller, and/or the adjustment path of the intermediate roller is fed back statically or dynamically into a control circuit.

5 Claims, 5 Drawing Sheets

METHOD OF CONTROLLING THE TRANSMISSION RATIO OF A CONTINUOUSLY VARIABLE TOROIDAL TRANSMISSION

BACKGROUND OF THE INVENTION

Field of the Invention

The invention relates to a method of controlling a transmission ratio of a continuously variable toroidal transmission. The continuously variable toroidal transmission has at least one pair of toroidal disks including an input disk and an output disk and at least one intermediate roller in power-transmitting contact with the toroidal disks. The toroidal transmission further has an adjustable pivot-bearing configuration supporting the intermediate roller. The transmission ratio is set by defining a continuously variable pivoted position of the intermediate roller between the input disk and the output disk. The transmission ratio is controlled by feeding an actual transmission ratio back to an input of a control circuit for the transmission ratio on a basis of a control mechanism with reference to a desired transmission ratio by adjustment of a holding force of the pivot-bearing configuration or its adjustment path.

Continuously variable toroidal transmissions transmit power by frictional rolling contact from a toroidal input disk, via an intermediate roller, to a toroidal output disk. The toroidal disks can have a "semi-toroidal geometry" or a "fully toroidal geometry".

The at least one intermediate roller between the disks of a pair of toroidal disks is held by an adjustable pivot-bearing configuration. Pivoting the intermediate roller changes its rolling-contact radii on the toroidal disks, leading in turn to a change in the transmission ratio. The normal force required to transmit frictional force is incidentally produced by pressing the toroidal disks axially into contact.

Previous control systems for the transmission ratio are based on a conventional method of controlling the angle of the intermediate roller, e.g. by a proportional-integral-differential (PID) controller. Here, the angle of the intermediate roller is effected by adjusting the steady-state holding force of the pivot-bearing configuration in the transmission that carries the intermediate roller and/or by adjusting its adjustment path. For control, the actual transmission ratio is applied to one input of the control circuit of the control system and reference is made to a desired transmission ratio. In the customary manner for control systems, the transmission ratio is controlled by recourse to the manipulated variable(s) of the steady-state holding force and/or of the adjustment path of the intermediate rollers.

Tests with conventional control systems of this kind have shown that the dynamic control response is in need of improvement. Special transmission configurations have been proposed to this end. Introducing a "housing angle", for example, increases the stability range of the control system, but this applies only in one direction of rotation of the transmission, e.g. when traveling forward.

The technical article by Prof. P. Tenberge titled "Toroidgetriebe mit verbesserten Kennwerten" [Toroidal Transmissions with Improved Characteristics], VDI Report No. 1393, 1998, pp. 703 to 724 moreover provides an overall view of how the conception and configuration of toroidal traction mechanisms can be optimized in terms of efficiency, control, installation space and power to weight ratio.

SUMMARY OF THE INVENTION

It is accordingly an object of the invention to provide a method of controlling the transmission ratio of a continuously variable toroidal transmission which overcomes the above-mentioned disadvantages of the prior art methods of this general type, which controls an angle of the intermediate roller.

With the foregoing and other objects in view there is provided, in accordance with the invention, a method of controlling a transmission ratio. The method includes providing a continuously variable toroidal transmission. The toroidal transmission has at least one pair of toroidal disks including an input disk and an output disk and at least one intermediate roller in power-transmitting contact with the toroidal disks. The toroidal transmission further has an adjustable pivot-bearing configuration supporting the intermediate roller. The transmission ratio is set by defining a continuously variable pivoted position of the intermediate roller between the input disk and the output disk. The transmission ratio is controlled by feeding an actual transmission ratio back to an input of a control circuit for defining the transmission ratio and a desired transmission ratio to the control circuit. A deviation between the desired transmission ratio and the actual transmission ratio is compensated for by adjusting a holding force of the pivot-bearing configuration and/or an adjustment path of the pivot-bearing configuration of the intermediate roller. The holding force is pilot-controlled as a function of:

torques acting on the toroidal disks and the pivoted position of the intermediate roller; and/or the adjustment path of the pivot-bearing configuration of the intermediate roller being fed back one of statically and dynamically into the control circuit.

The object is achieved by adding two additional components to the standard control mechanism, namely, pilot-controlling the holding force as a function of the torques acting on the toroidal disks and of the pivoted position of the intermediate roller and feeding back the adjustment path of the pivot-bearing configuration of the intermediate roller into the control circuit. By these two components, the conventional control concept is significantly extended, enabling various advantages to be achieved. Thus pilot control of the holding force isolates the control circuit from the effect of changes in the torque at the inputs and outputs of the transmission, taking into account the instantaneous pivoting angle of the intermediate roller. Without pilot control of the holding force, the transmission ratio controller merely responds to the effect of changes in torque instead of taking them into account as the cause of disturbances in the desired transmission ratio.

The possibility of feeding back the position of the intermediate roller separately from or in combination with pilot control of the holding force provides an effective system variable for controlling oscillations in the variation of the transmission ratio with time. In particular, it provides an effective method of damping oscillations.

The steady-state holding force $F_z$ is pilot-controlled in accordance with the relation $$F_z = M1/R01 + M2/R02$$

where:
M1 is the torque at the input disk,
M2 is the torque at the output disk,
R01 is the rolling radius of the intermediate roller on the input disk, and
R02 is the rolling radius of the intermediate roller on the output disk.

This is the fundamental relation for a pair of toroidal disks with an intermediate roller.

This relation is expanded to cover a toroidal transmission configuration having a plurality of pairs of toroidal disks and a plurality of intermediate rollers in each toroidal configuration. The steady-state holding force ($F_z$) is accordingly pilot-controlled as a function of the relation $$F_z=(M1/R1+M2/R2)/(NT \cdot NZ)$$

where:
- M1 is the torque at the input disk,
- M2 is the torque at the output disk,
- R1 is the rolling radius of the intermediate roller on the input disk,
- R2 is the rolling radius of the intermediate roller on the output disk,
- NT is the number of toroidal configurations, and
- NZ is the number of intermediate rollers in each toroidal configuration.

In a further mode of the invention, a time derivative (dz/dt) of the adjustment path of the intermediate roller is used as the variable fed back for the purpose of feedback. The fed-back variable can preferably be additionally multiplied by a gain factor.

Other features which are considered as characteristic for the invention are set forth in the appended claims.

Although the invention is illustrated and described herein as embodied in a method of controlling the transmission ratio of a continuously variable toroidal transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
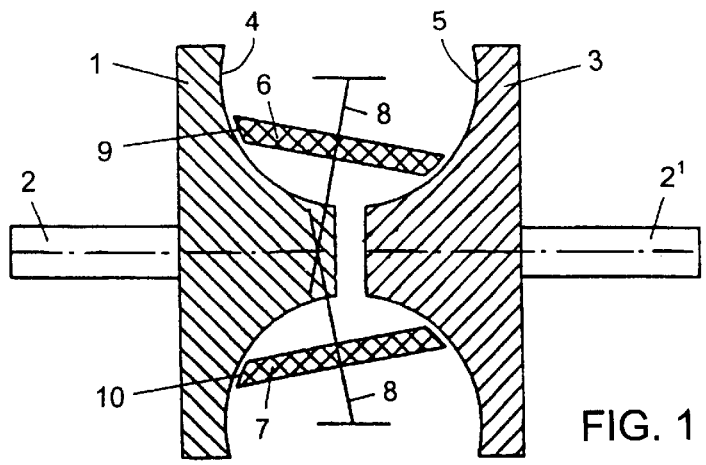
FIG. 1 is a diagrammatic, axial sectional view through a toroidal transmission according to the invention.

In all the figures of the drawing, sub-features and integral parts that correspond to one another bear the same reference symbol in each case. Referring now to the figures of the drawing in detail and first, particularly, to FIG. 1 thereof, there is shown the more important components of a continuously variable toroidal transmission. They include an input disk 1, which accepts an engine torque and is coupled to an engine output by a shaft 2 and, in the vast majority of cases, a clutch or torque converter (not shown specifically). Together with an output disk 3, which likewise has a shaft 2', the input disk 1 forms a pair of toroidal disks. Their mutually facing contact surfaces 4, 5 together form a toroidal surface.

Between the two toroidal disks 1, 3 there is at least one but, in the vast majority of cases, two or three intermediate rollers 6, 7 with a radius $R_r$ (Bee FIG. 3), which are mounted in such a way as to be pivotable and rotatable about their own axes on a pivot-bearing configuration 8 (shown only in an indicative way in FIG. 1). As can be seen from FIG. 3, a center of motion CM is at a distance $R_0$ from a central axis CA. The intermediate rollers 6, 7 are in rolling frictional contact by their circumferential surfaces 9, 10 with the contact surfaces 4, 5 of the toroidal disks 1, 3, with the result that an angular velocity W1 of the input disk 1 is converted with a torque M1 into a rotary motion of the output disk 3 with an angular velocity W2 and a torque M2.

Figure 2:
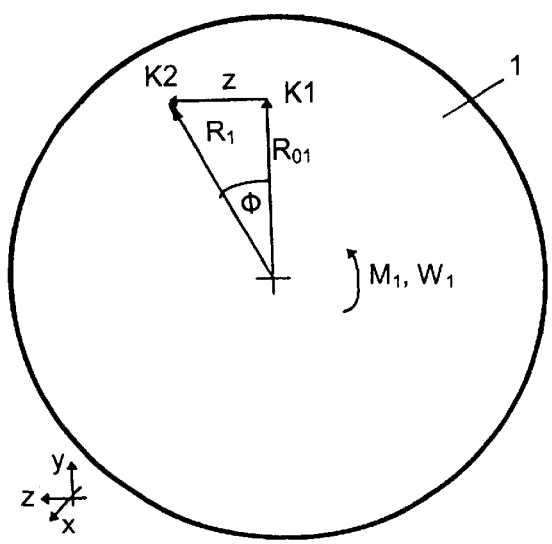
FIGS. 2 and 3 are schematic diagrams of a toroidal disk and of the toroidal transmission to illustrate characteristic quantities.
Figure 3:
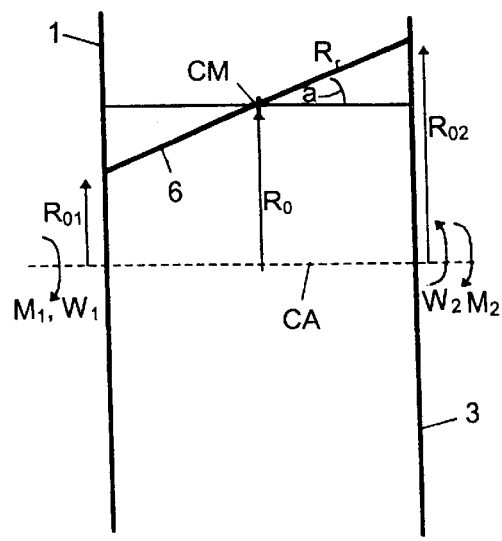

The corresponding variables, which are representative of the toroidal transmission, are clear from FIGS. 2 and 3. Thus the rolling-contact radii R01 and R02 of the intermediate rollers on the input disk 1 and the output disk 3 are determined by a pivoting angle α (FIG. 3) of the respective intermediate roller (only one intermediate roller 6 is shown in FIG. 3). When the angle α=0, a transmission ratio is 1:1. When R01<R02, as shown in FIG. 3, the relation between the angular velocities of the disks 1, 3 is W2<W1.

It is a familiar feature of toroidal transmissions that their configuration requires the application of a holding force in the z direction (see FIG. 2) by the pivot-bearing configuration 8 of the intermediate rollers 6, 7. To adjust the pivoting angle α, the intermediate roller 6, 7 must furthermore be adjusted in the z direction by an appropriate deflection of the pivot-bearing configuration 8. As indicated in FIG. 2, roller contact point K1 changes by the amount z to roller contact point K2 when the intermediate roller 6 is adjusted in the z direction, the latter contact point having a larger rolling-contact radius R1 than the rolling-contact radius R01.

If the dynamics of the tilting movement, i.e. the variation in the pivoting angle α with time, and the dynamics of the adjustment of the intermediate rollers in the z direction are now examined by setting up appropriate equations of motion, it will be found that, with the customary optimized boundary conditions and omissions, e.g. without including bearing friction in the transmission, that even under constant operating conditions a supporting force $F_z$ must be applied in the z direction at the pivot-bearing configuration 8. This supporting force satisfies the equation $$F_z - M1/R01 - M2/R02 = 0, \text{ for example.}$$

This relation can be used for pilot control of the supporting or holding force.

Figure 4:
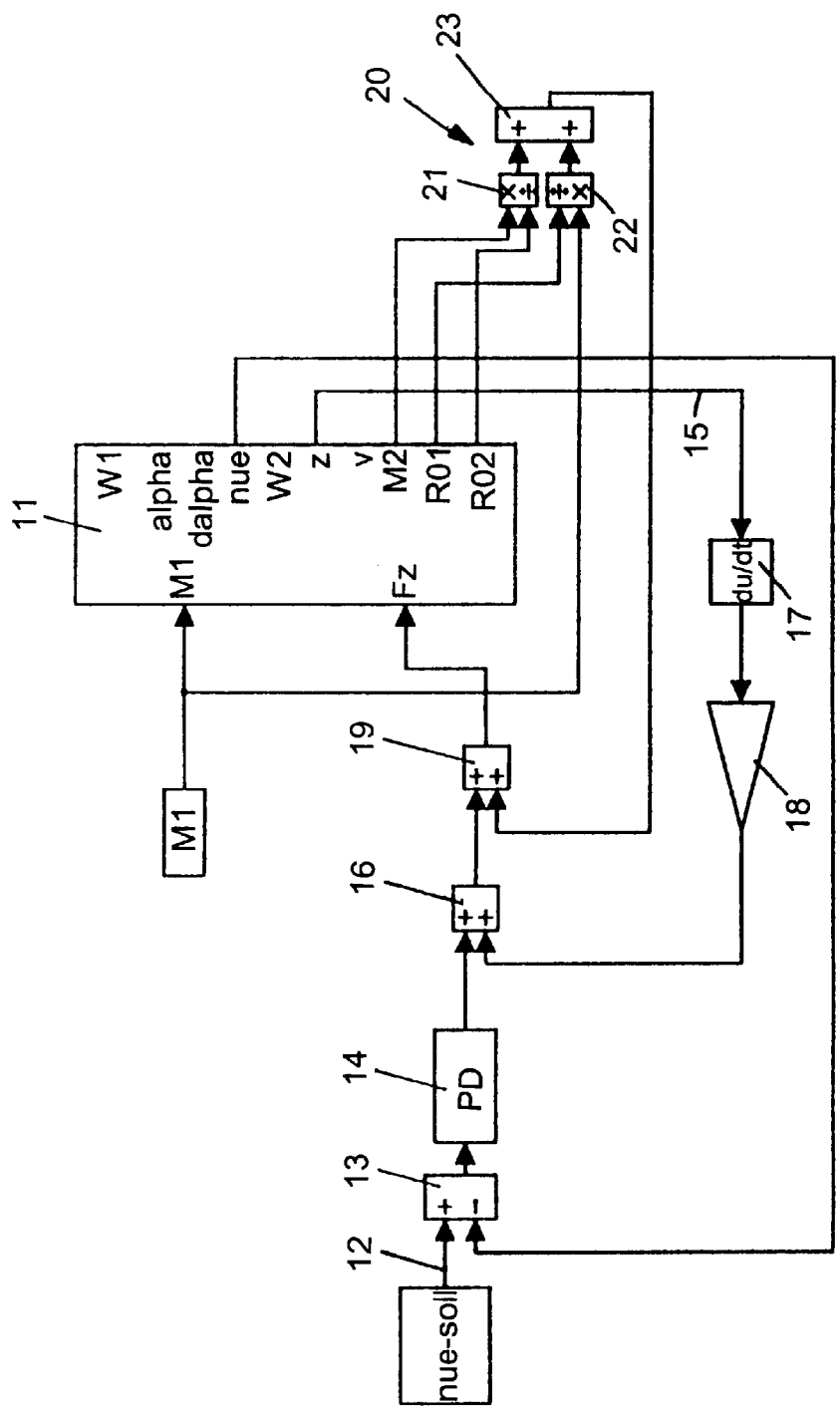
FIG. 4 is a circuit diagram of a control method used for controlling a transmission ratio.

The optimized control method can now be explained with reference to FIG. 4 which shows a corresponding diagram of a simulation model for the control method.

The starting point here is a system model 11, which represents the variables provided according to the model and various system equations, which do not need to be explained in detail here. With the system model 11, the output variables are, for example, the angular velocity W1 of the input disk 1, the pivoting angle α of the intermediate roller 6 on the toroidal disks 1, 3, a transmission ratio nue, vehicle speed V, the torque M2 of the output disk 3 and the rolling-contact radii R01 and R02 of the intermediate roller 6. The input variables of the system model are the torque M1 of the input disk 1 and the holding force $F_z$.

On the input side, the control system is supplied with the desired ratio at an input 12, which is compared with the respective actual ratio nue from the system model 11 in a summer 13. A difference signal representing a deviation is fed to a controller 14, which outputs a corresponding actuating signal at its output. In the example of simulation, a PD controller (proportional plus derivation controller) with control parameters P (proportional)=−200 and D (derivative)=−50 was used. An acceleration process has been simulated.

An adjustment path z of the intermediate roller 6 generated as an output signal by the system model 11 can be fed back by way of a feedback loop 15. Here, the adjustment path z is differentiated with respect to time (dz/dt) by a differentiating element 17 and then multiplied by a gain factor at 18. This signal is added to the output signal of the controller 14 (reference numeral 16). The output signal of the adder 16 in turn is supplied with the steady-state holding force as a pilot-control signal from a corresponding calculation element 20 (reference numeral 19). The input variables of the calculation element 20 are the rolling-contact radius R01 and R02 and the torque M2 of the output disk 3. The torque M1 of the input disk 1 is picked off from the input side of the system model 11. The respective quotients M1/R01 and M2/R02 are formed in quotient elements 21, 22 and the results are added in the adder 23, giving the required pilot control of the holding force.

In the example of simulation, various model constants have been defined by way of example, e.g. the masses of the input disk 1, the output disk 3 and the intermediate roller 6 as 1 kg in each case, the moments of inertia of these elements as 0.05 kg/m$^2$ in each case, a distance between the pivoting axis of the intermediate roller 6 from the axes of the toroidal disks 1, 3 as 0.05 m, the radius of the intermediate roller as 0.07 m, a mass of the vehicle as 1,200 kg, the coefficient of rolling resistance as 4.9515 Ns/m, the drag coefficient as 0.4828 Ns$^2$/m$^2$, a wheel radius as 0.288 m and the transmission ratio of a differential associated with the toroidal transmission as 0.2727.

Figure 5:
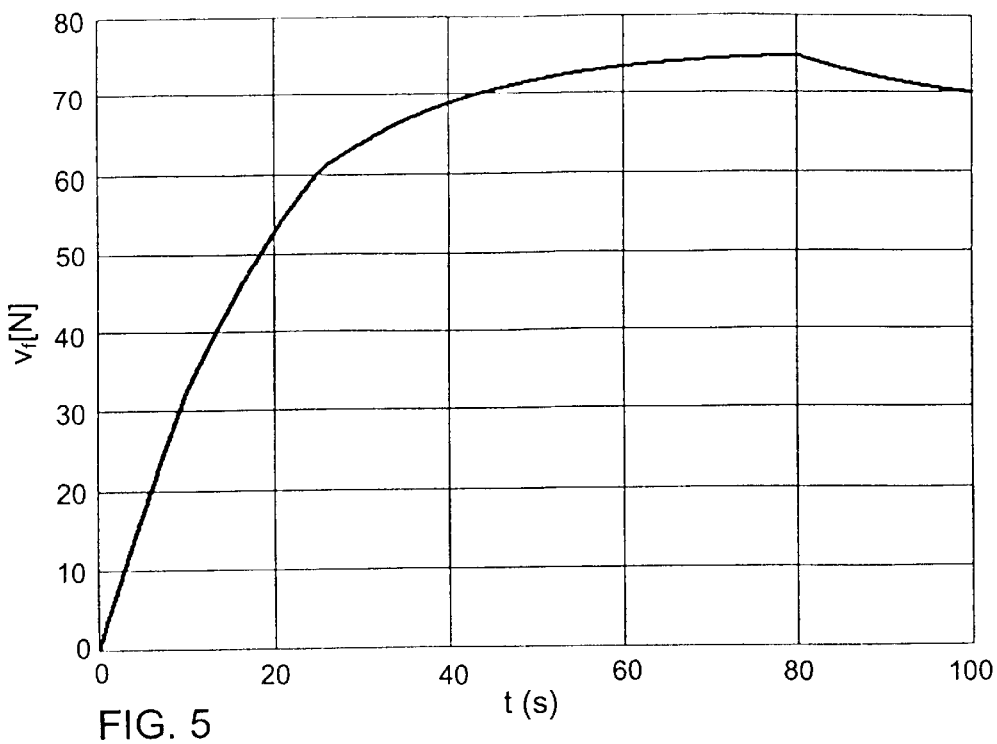
FIG. 5 is a graph of a simulated vehicle speed as a function of time.
Figure 6:
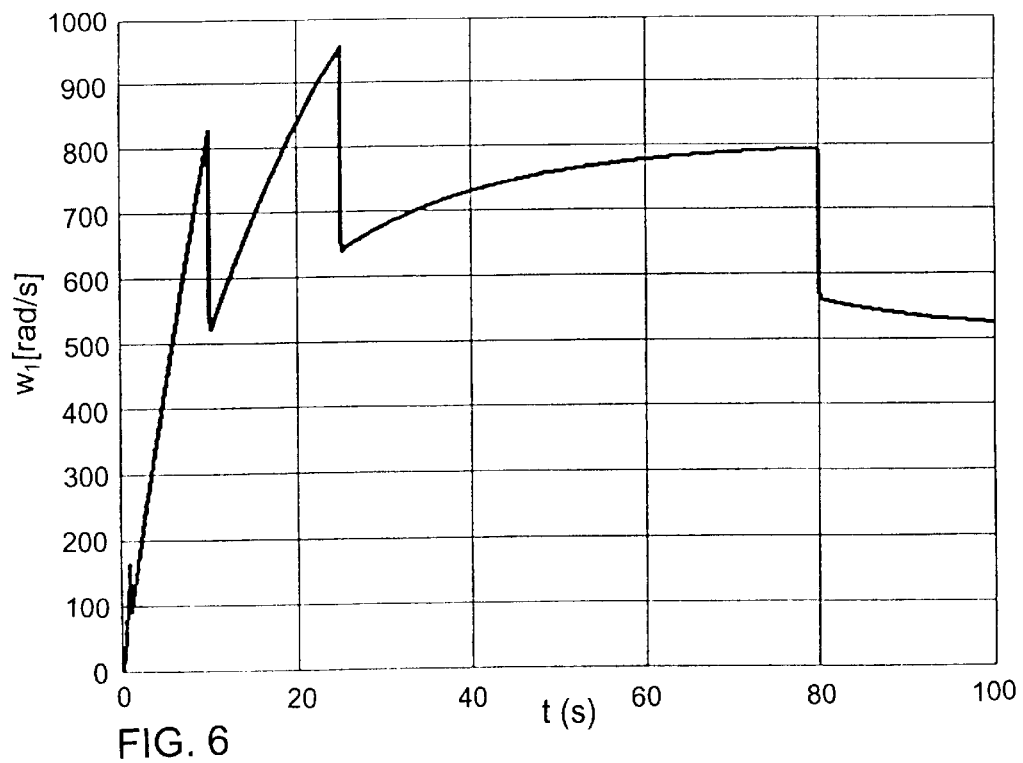
FIG. 6 is a graph of an angular velocity of an input disk as a function of time.
Figure 7:
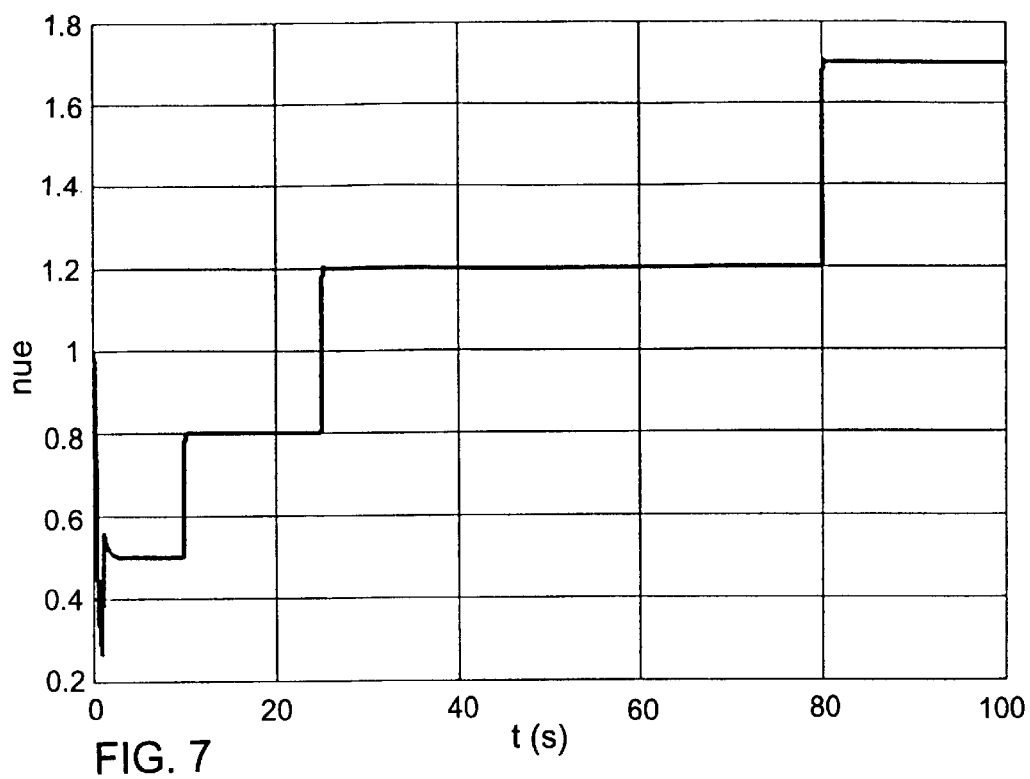
FIG. 7 is a graph of a speed ratio as a function of time.
Figure 8:
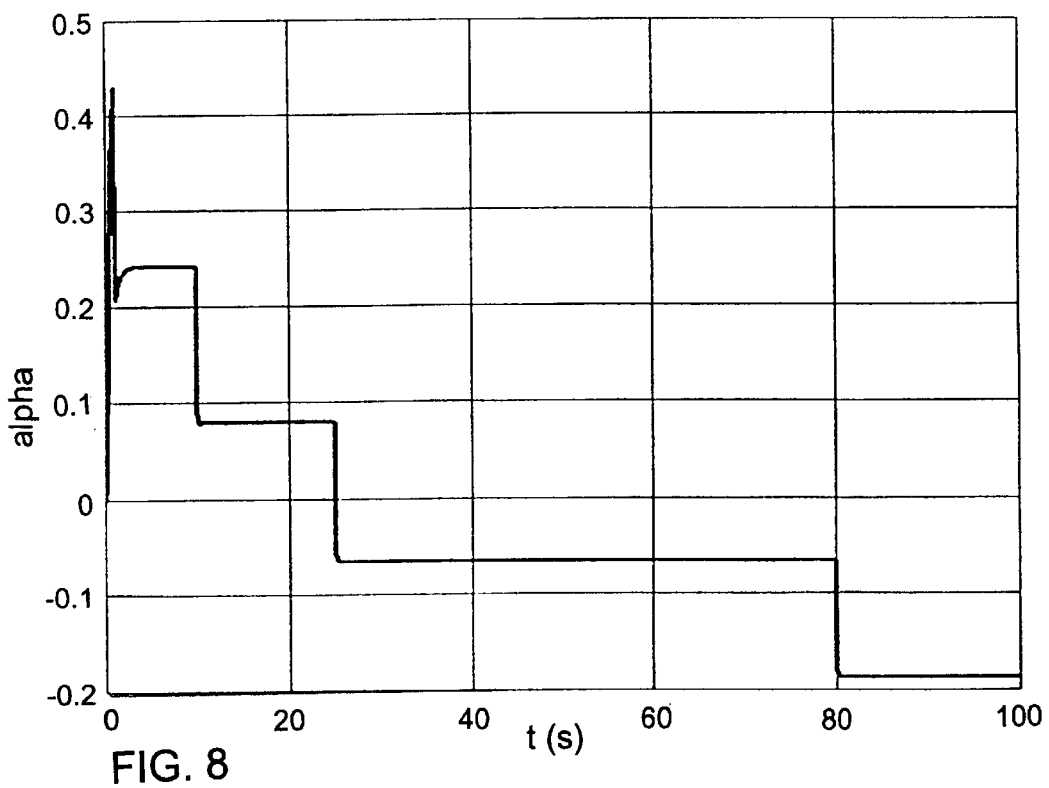
FIG. 8 is a graph of a tilt angle of an intermediate roller as a function of time.

The results of the simulation can be seen in FIGS. 5 to 13. Thus FIG. 5 shows a speed characteristic of the simulated process of vehicle acceleration, which becomes increasingly shallow from one shift stage to the next. FIG. 6 shows the angular velocity W1 of the input disk 1, which has a typical value that rises steadily in a particular shift stage and falls suddenly when the transmission is shifted. The antisymmetrical shape of the ratio curve (FIG. 7) and a pivoting-angle curve (FIG. 8) in FIGS. 7 and 8 illustrate the correlation between these two variables. In the individual shift stages, the transmission ratio of the transmission and the pivoting angle have remained constant.

Figure 9:
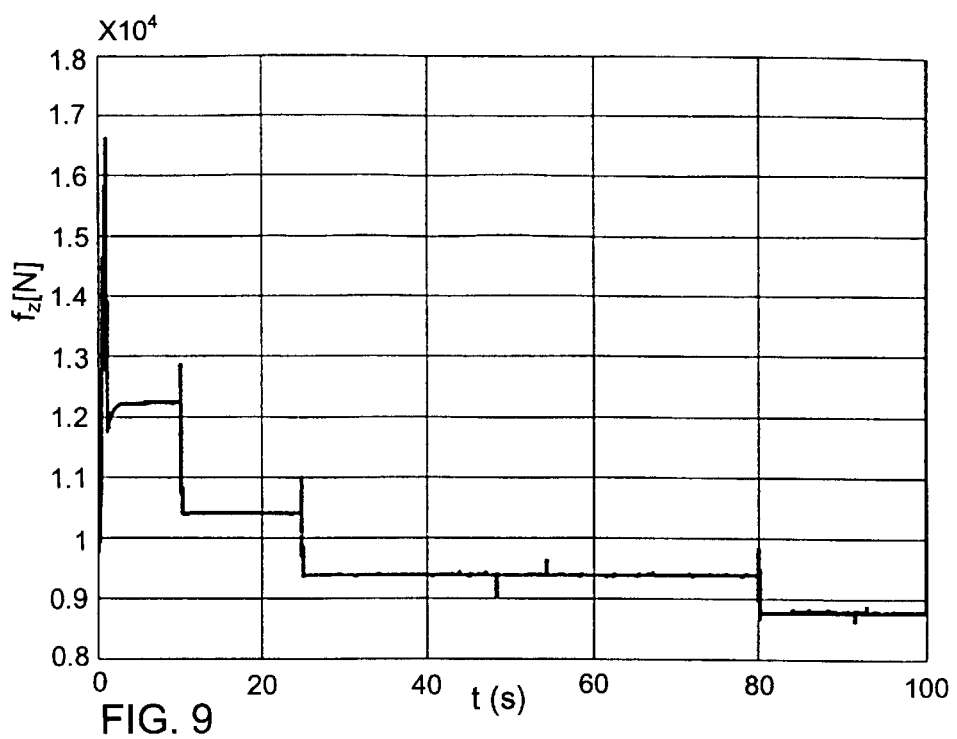
FIG. 9 is a graph of a holding force applied by a pivot-bearing configuration of the intermediate roller as a function of time.
Figure 10:
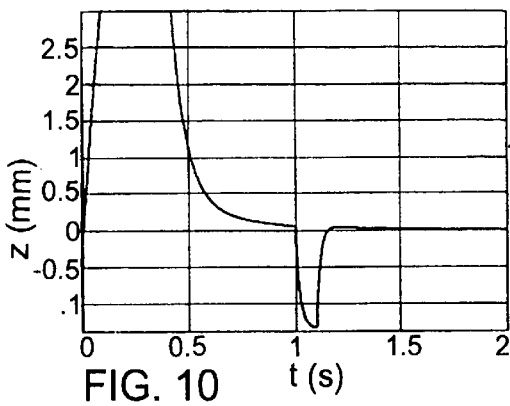
FIGS. 10 to 13 are graphs showing adjustment paths of the intermediate roller during a first to fourth shift operations as a function of time.
Figure 11:
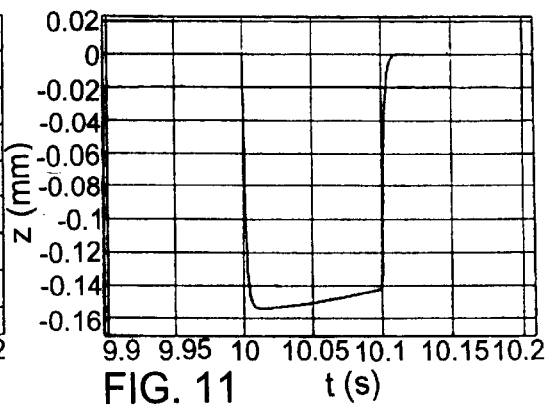
Figure 12:
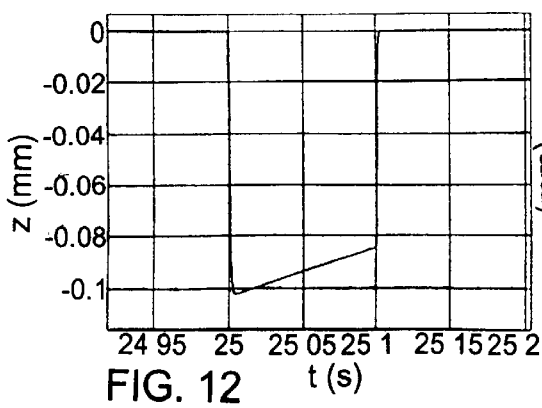
Figure 13:
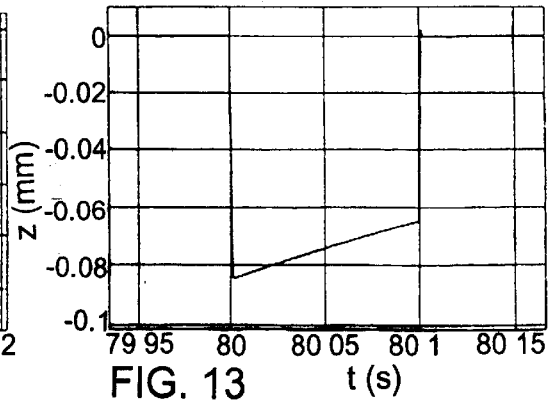

FIG. 9 illustrates the variation in the holding force Fz for the pivot-bearing configuration, which is likewise correlated with the individual shift stages.

The diagrams in FIGS. 10 to 13, which show the adjustment path of the intermediate roller 6, illustrate clearly that the corresponding shift operations are brought about by a very brief and highly defined displacement of the pivoting roller.

We claim:

1. A method of controlling a transmission ratio, which comprises the steps of:

providing a continuously variable toroidal transmission, the toroidal transmission having at least one pair of toroidal disks including an input disk and an output disk and at least one intermediate roller in power-transmitting contact with the toroidal disks, the toroidal transmission further having an adjustable pivot-bearing configuration supporting the intermediate roller;

setting the transmission ratio by defining a continuously variable pivoted position of the intermediate roller between the input disk and the output disk;

controlling the transmission ratio by feeding an actual transmission ratio back to an input of a control circuit for defining the transmission ratio and a desired transmission ratio to the control circuit, a deviation between the desired transmission ratio and the actual transmission ratio being compensated for by adjusting at least one of a holding force of the pivot-bearing configuration and an adjustment path of the pivot-bearing configuration of the intermediate roller;

pilot-controlling the holding force as a function of torques acting on the toroidal disks and the pivoted position of the intermediate roller; and feeding back the adjustment path of the pivot-bearing configuration of the intermediate roller one of statically and dynamically into the control circuit.

2. The method according to claim 1, wherein the holding force is a steady-state holding force that is pilot-controlled as a function of:

$$F_z = M1/R01 + M2/R02$$

where:

M1 is a torque at the input disk,

M2 is a torque at the output disk,

R01 is a rolling-contact radius of the intermediate roller on the input disk,

R02 is a rolling-contact radius of the intermediate roller on the output disk, and $F_z$ is the holding force.

3. The method according to claim 1, which comprises providing a plurality of the pairs of the toroidal disks, and the holding force is a steady-state holding force that is pilot-controlled as a function:

$$F_z = (M1/R1 + M2/R2)/(NT \cdot NZ)$$

where:

M1 is a torque at the input disk,

M2 is a torque at the output disk,

R01 is a rolling-contact radius of the intermediate roller on the input disk,

R02 is a rolling-contact radius of the intermediate roller on the output disk,

NT is a number of pairs of the toroidal disks,

NZ is a number of the intermediate rollers associated with each pair of the toroidal disks, and $F_z$ is the steady state holding force.

4. A method of controlling a transmission ratio, which comprises the steps of:

providing a continuously variable toroidal transmission, the toroidal transmission having at least one pair of toroidal disks including an input disk and an output disk and at least one intermediate roller in power-transmitting contact with the toroidal disks, the toroidal transmission further having an adjustable pivot-bearing configuration supporting the intermediate roller;

setting the transmission ratio by defining a continuously variable pivoted position of the intermediate roller between the input disk and the output disk;

controlling the transmission ratio by feeding an actual transmission ratio back to an input of a control circuit for defining the transmission ratio and a desired transmission ratio to the control circuit, a deviation between the desired transmission ratio and the actual transmission ratio being compensated for by adjusting at least one of a holding force of the pivot-bearing configuration and an adjustment path of the pivot-bearing configuration of the intermediate roller;

pilot-controlling the holding force as a function of torques acting on the toroidal disks and the pivoted position of the intermediate roller; and feeding back a time derivative of the adjustment path of the pivot-bearing configuration of the intermediate roller one of statically and dynamically into the control circuit.

5. The method according to claim 4, which comprises multiplying the time derivative by a gain factor.

* * * * *